United States Patent
Aso et al.

(10) Patent No.: US 12,218,357 B2
(45) Date of Patent: Feb. 4, 2025

(54) ALL-SOLID-STATE SECONDARY BATTERY USING POLYMER BINDER MADE FROM UNSATURATED CARBOXYLIC ACID ESTER NOT HAVING HYDROXYL GROUPS AND COMPOUND HAVING A TERIARY AMINE GROUP AND METHOD OF MANUFACTURING SAME

(71) Applicant: ENEOS MATERIALS CORPORATION, Tokyo (JP)

(72) Inventors: Keigo Aso, Minato-ku (JP); Taira Ohashi, Minato-ku (JP); Motohisa Azechi, Minato-ku (JP); Daisuke Sukeguchi, Minato-ku (JP); Shingo Itai, Minato-ku (JP)

(73) Assignee: ENEOS MATERIALS CORPORATION, Tokyo (JP)

( * ) Notice: Subject to any disclaimer, the term of this patent is extended or adjusted under 35 U.S.C. 154(b) by 649 days.

(21) Appl. No.: 17/599,277

(22) PCT Filed: Mar. 6, 2020

(86) PCT No.: PCT/JP2020/009664
§ 371 (c)(1),
(2) Date: Sep. 28, 2021

(87) PCT Pub. No.: WO2020/203042
PCT Pub. Date: Oct. 8, 2020

(65) Prior Publication Data
US 2022/0190342 A1 Jun. 16, 2022

(30) Foreign Application Priority Data

Mar. 29, 2019 (JP) ................................ 2019-066166

(51) Int. Cl.
*H01M 4/62* (2006.01)
*C08F 220/18* (2006.01)
*H01M 4/139* (2010.01)
*H01M 10/0562* (2010.01)

(52) U.S. Cl.
CPC ....... *H01M 4/622* (2013.01); *C08F 220/1804* (2020.02); *C08F 220/1808* (2020.02); *C08F 220/1812* (2020.02); *H01M 4/139* (2013.01); *H01M 10/0562* (2013.01); *H01M 2300/0068* (2013.01)

(58) Field of Classification Search
CPC .. H01M 4/622; H01M 4/139; H01M 10/0562; C08F 220/1804; C08F 220/1812; C08F 220/1808

USPC ......................... 429/217, 251, 254, 304, 317
See application file for complete search history.

(56) References Cited

U.S. PATENT DOCUMENTS

| 6,200,707 B1 | 3/2001 | Takada et al. |
| 2011/0021731 A1 | 1/2011 | Hirata et al. |
| 2014/0186680 A1* | 7/2014 | Kim ................... H01M 50/42 429/144 |
| 2017/0110733 A1* | 4/2017 | Yoon ................... H01M 4/1391 |
| 2020/0243904 A1* | 7/2020 | Mochizuki .......... H01M 10/052 |
| 2022/0069279 A1* | 3/2022 | Nam ................. H01M 10/0525 |

FOREIGN PATENT DOCUMENTS

| JP | 7-87045 B2 | 9/1995 | |
| JP | 11-86899 A | 3/1999 | |
| JP | 2015088484 A * | 5/2015 | .......... H01M 2/1653 |
| KR | 10-2019-0004562 A | 1/2019 | |
| KR | 2019004562 A * | 1/2019 | .............. C09J 11/06 |
| WO | WO 2009/107784 A1 | 9/2009 | |

OTHER PUBLICATIONS

International Search Report mailed on May 26, 2020 in PCT/JP2020/009664 filed on Mar. 6, 2020 (2 pages).
Japanese Office Action issued Mar. 19, 2024 in Japanese Patent Application No. 2021-511297 (with unedited computer-generated English translation), 3 pages.
Extended European Search Report issued Nov. 2, 2022 in European Patent Application No. 20785194.0, 9 pages.
Fang, S., et al., "Effect of N,N-dimethylacrylamide (DMA) on the comprehensive properties of acrylic latex pressure sensitive adhesives", International Journal of Adhesion & Adhesives, vol. 71, Sep. 10, 2016, XP029758502, pp. 105-111.

* cited by examiner

*Primary Examiner* — Sean P Cullen
(74) *Attorney, Agent, or Firm* — Oblon, McClelland, Maier & Neustadt, L.L.P.

(57) ABSTRACT

A binder for an all-solid-state secondary battery that can control a decrease in ionic conductivity, is excellent in binding properties and oxidation resistance, and can realize favorable cycle life characteristics even under a high voltage; and a binder composition for an all-solid-state secondary battery containing the binder. A binder for an all-solid-state secondary battery includes a polymer (A) which includes a repeating unit (a1) derived from an unsaturated carboxylic acid ester (excluding an unsaturated carboxylic acid ester having a hydroxyl group) and a repeating unit (a2) derived from a compound having a tertiary amino group, a weight-average molecular weight (Mw) of the polymer (A) being from 250000 to 3000000, and an endothermic peak being observed at −10° C. or lower when differential scanning calorimetry (DSC) is performed on the polymer (A) in accordance with JIS K 7121.

14 Claims, No Drawings

ALL-SOLID-STATE SECONDARY BATTERY USING POLYMER BINDER MADE FROM UNSATURATED CARBOXYLIC ACID ESTER NOT HAVING HYDROXYL GROUPS AND COMPOUND HAVING A TERIARY AMINE GROUP AND METHOD OF MANUFACTURING SAME

CROSS-REFERENCE TO RELATED APPLICATIONS

The present application is the national stage of international application PCT/JP2020/009664, filed on Mar. 6, 2020, and claims the benefit of the filing date of Japanese Appl. No. 2019-066166, filed on Mar. 29, 2019.

TECHNICAL FIELD

The present invention relates to a binder for an all-solid-state secondary battery; a binder composition for an all-solid-state secondary battery containing the binder; a slurry for an all-solid-state secondary battery containing the composition and a solid electrolyte; a solid electrolyte sheet for an all-solid-state secondary battery formed by applying the slurry on a substrate and drying, and a method of manufacturing the same; and an all-solid-state secondary battery including the sheet, and a method of manufacturing the same.

BACKGROUND ART

Currently, research on large type lithium ion batteries is being actively conducted for use in drive power sources for automobiles and household storage batteries. An electrolyte solution is used in many of commonly used lithium ion secondary batteries. All-solid-state secondary batteries in which this electrolyte solution is replaced with a solid electrolyte and all of constituent materials are solid are being developed as ultimate batteries having safety, high energy density, and long life.

Since a solid electrolyte showing high ionic conductivity is used in all-solid-state secondary batteries, there is no risk of liquid leakage or ignition, and safety and reliability are excellent. Furthermore, all-solid-state secondary batteries are also suitable for increasing the energy density by stacking electrodes. Specifically, they can be batteries having a structure in which an active material layer and a solid electrolyte layer are arranged side by side and serialized. At this time, since a metal package for sealing a battery cell, copper wire for connecting the battery cell, and a busbar can be omitted, the energy density of a battery can be significantly increased. Furthermore, good compatibility with a positive electrode material capable of increasing the potential is an example of another advantage.

On the other hand, problems when manufacturing all-solid-state secondary batteries have also become apparent. Specifically, in a case where a pressure-molded body of a mixture of a solid electrolyte as an electrolyte and an active material is prepared in order to increase a contact area therebetween, the pressure-molded body is hard and brittle and is poor in workability. Furthermore, since the active material is accompanied by a volume change due to occlusion and release of lithium ions, the pressure-molded body has problems in which the active material peels off according to a charge and discharge cycle and a significant decrease in capacity occurs.

Therefore, in order to improve moldability, a technique for further adding a binder component to the mixture to improve moldability has been studied (refer to, for example, PTL 1 to PTL 3).

CITATION LIST

Patent Literature

PTL 1: JP-A-11-86899
PTL 2: JP-B-7-87045
PTL 3: WO 2009/107784

SUMMARY OF INVENTION

Technical Problem

It is thought that a binder component composed of a polymer compound disclosed in PTL 1 to PTL 3 has favorable characteristics as an all-solid-state secondary battery under a conventional applied voltage. However, since the surface of the solid electrolyte is covered with a polymer compound, ionic conduction between solid electrolytes is likely to be inhibited, a high level of cycle life characteristics under a high voltage currently required for all-solid-state secondary batteries may not be able to be satisfied, and further improvement is required.

Accordingly, some aspects according to the invention are to provide a binder for an all-solid-state secondary battery that can control a decrease in ionic conductivity, has excellent binding properties and oxidation resistance, and can realize favorable cycle life characteristics even under a high voltage; and a binder composition for an all-solid-state secondary battery containing the binder.

Solution to Problem

The invention has been made to solve at least a part of the above-mentioned problems and can be realized as any of the following aspects.

One aspect of a binder for an all-solid-state secondary battery according to the invention contains a polymer (A) which contains a repeating unit (a1) derived from an unsaturated carboxylic acid ester (excluding an unsaturated carboxylic acid ester having a hydroxyl group) and a repeating unit (a2) derived from a compound having a tertiary amino group, a weight-average molecular weight (Mw) of the polymer (A) being from 250000 to 3000000, and an endothermic peak being observed at $-10°$ C. or lower when differential scanning calorimetry (DSC) is performed on the polymer (A) in accordance with JIS K 7121.

In one aspect of the above-mentioned binder for an all-solid-state secondary battery, the polymer (A) may further contain a repeating unit (a3) derived from an unsaturated carboxylic acid ester having a hydroxyl group.

In any of the aspects of the above-mentioned binder for an all-solid-state secondary battery, 0.1 to 20 parts by mass of the repeating unit (a3) derived from an unsaturated carboxylic acid ester having a hydroxyl group may be contained when a total amount of the repeating units contained in the polymer (A) is 100 parts by mass.

In any of the aspects of the above-mentioned binder for an all-solid-state secondary battery, 0.1 to 20 parts by mass of the repeating unit (a2) derived from a compound having a tertiary amino group may be contained when a total amount of the repeating units contained in the polymer (A) is 100 parts by mass.

One aspect of a binder composition for an all-solid-state secondary battery according to the invention contains the binder for an all-solid-state secondary battery of any one of the above-mentioned aspects; and a liquid medium (B).

In one aspect of the above-mentioned binder composition for an all-solid-state secondary battery, the liquid medium (B) may be at least one selected from the group consisting of aliphatic hydrocarbons, alicyclic hydrocarbons, aromatic hydrocarbons, ketones, esters, and ethers.

In any of the aspects of the above-mentioned binder composition for an all-solid-state secondary battery, the polymer (A) may be particles having a number average particle diameter from 50 nm to 5000 nm.

One aspect of a slurry for an all-solid-state secondary battery according to the invention contains the binder composition for an all-solid-state secondary battery of any one of the above-mentioned aspects; and a solid electrolyte.

In one aspect of the above-mentioned slurry for an all-solid-state secondary battery, the slurry for an all-solid-state secondary battery may contain a sulfide-based solid electrolyte or an oxide-based solid electrolyte as the solid electrolyte.

One aspect of an all-solid-state secondary battery according to the invention includes at least: a positive electrode active material layer, a solid electrolyte layer; and a negative electrode active material layer, in which at least one layer of the positive electrode active material layer, the solid electrolyte layer, and the negative electrode active material layer is a layer formed by applying and drying the slurry for an all-solid-state secondary battery of any of the above-mentioned aspects.

One aspect of a solid electrolyte sheet for an all-solid-state secondary battery according to the invention includes a layer formed by applying the slurry for an all-solid-state secondary battery of any of the above-mentioned aspects on a substrate and drying the slurry.

One aspect of a method of manufacturing a solid electrolyte sheet for an all-solid-state secondary battery according to the invention includes a step of applying the slurry for an all-solid-state secondary battery of any of the above-mentioned aspects on a substrate and drying the slurry.

One aspect of a method of manufacturing an all-solid-state secondary battery according to the invention includes manufacturing an all-solid-state secondary battery through the above aspect of the method of manufacturing a solid electrolyte sheet for an all-solid-state secondary battery.

Advantageous Effects of Invention

According to the binder composition for an all-solid-state secondary battery according to the invention, excellent effects, in which the binder composition has an appropriate viscosity and thus is excellent in workability, can control a decrease in ionic conductivity, is also excellent in binding properties and oxidation resistance, and can realize favorable cycle life characteristics even under a high voltage, are exhibited when used as a material for a solid electrolyte layer and/or an active material layer of an all-solid-state secondary battery.

DESCRIPTION OF EMBODIMENTS

Hereinafter, suitable embodiments according to the invention will be described in detail. The invention is not limited to only embodiments described below, but should be understood to include various modification examples performed in the range not changing the gist of the invention. "(Meth) acrylic acid-" in the present description is a concept including both "acrylic acid-" and "methacrylic acid-". Similarly, "-(meth)acrylate" is a concept including both "-acrylate" and "-methacrylate". Similarly, "(meth)acrylamide" is a concept including both "acrylamide" and "methacrylamide".

In the present description, the numerical range described as "from A to B" is interpreted as including the numerical value A as the lower limit value and the numerical value B as the upper limit value.

1. BINDER FOR ALL-SOLID-STATE SECONDARY BATTERY

A binder for an all-solid-state secondary battery according to the present embodiment contains a polymer (A). The polymer (A) is a polymer which contains a repeating unit (a1) derived from an unsaturated carboxylic acid ester (excluding an unsaturated carboxylic acid ester having a hydroxyl group) (hereinafter, also simply referred to as a "repeating unit (a1)") and a repeating unit (a2) derived from a compound having a tertiary amino group (hereinafter, also simply referred to as a "repeating unit (a2)"), in which a weight-average molecular weight (Mw) is from 250000 to 3000000, and in which an endothermic peak is observed at −10° C. or lower when differential scanning calorimetry (DSC) is performed in accordance with JIS K 7121.

Furthermore, in addition to the repeating unit (a1) and the repeating unit (a2), the polymer (A) may contain a repeating unit derived from another monomer copolymerizable therewith.

Hereinafter, each of the repeating units constituting the polymer (A), the physical properties of the polymer (A), and a manufacturing method will be described in this order.

1.1. Repeating Unit Constituting Polymer (A)

<Repeating Unit (a1) Derived from Unsaturated Carboxylic Acid Ester>

The polymer (A) contains the repeating unit (a1) derived from an unsaturated carboxylic acid ester (excluding an unsaturated carboxylic acid ester having a hydroxyl group). The unsaturated carboxylic acid ester is not particularly limited, but a (meth)acrylic acid ester is preferable. Specific examples of the (meth)acrylic acid ester include methyl (meth)acrylate, ethyl (meth)acrylate, n-propyl (meth)acrylate, isopropyl (meth)acrylate, n-butyl (meth)acrylate, isobutyl (meth)acrylate, n-amyl (meth)acrylate, isoamyl (meth)acrylate, hexyl (meth)acrylate, cyclohexyl (meth)acrylate, 2-ethylhexyl (meth)acrylate, n-octyl (meth)acrylate, nonyl (meth)acrylate, decyl (meth)acrylate, dodecyl (meth)acrylate, ethylene glycol di(meth)acrylate, propylene glycol di(meth)acrylate, trimethylolpropane tri(meth)acrylate, pentaerythritol tetra(meth)acrylate, dipentaerythritol hexa(meth)acrylate, allyl (meth)acrylate, and isobornyl (meth)acrylate, and the (meth)acrylic acid ester can be one or more selected from these. Among these, one or more selected from methyl (meth)acrylate, ethyl (meth)acrylate, n-butyl (meth)acrylate, isobutyl (meth)acrylate, cyclohexyl (meth)acrylate, 2-ethylhexyl (meth)acrylate, dodecyl (meth)acrylate, and isobornyl (meth)acrylate are preferable, and n-butyl (meth)acrylate is particularly preferable. These monomers can be used alone or in combination of two or more kinds. The term "unsaturated carboxylic acid ester" in the invention does not include unsaturated carboxylic acid esters having a hydroxyl group.

The lower limit of the content ratio of the repeating unit (a1) derived from an unsaturated carboxylic acid ester is preferably 40 parts by mass, more preferably 50 parts by mass, and particularly preferably 65 parts by mass when the total amount of the repeating units contained in the polymer (A) is 100 parts by mass. Meanwhile, the upper limit of the content ratio of the repeating unit (a1) derived from an unsaturated carboxylic acid ester is preferably 99.9 parts by mass, more preferably 99.7 parts by mass, and particularly preferably 97 parts by mass when the total amount of the repeating units contained in the polymer (A) is 100 parts by mass. Since the polymer (A) contains the repeating unit (a1) in the above-mentioned range, the highly hydrophobic polymer (A) is present in a dissolved or partially dissolved state in a liquid medium (B), and therefore the binding properties between an active material and a solid electrolyte, and a filler such as a conductive auxiliary agent due to the polymer (A) are improved, and a slurry for an all-solid-state secondary battery (hereinafter, also simply referred to as "slurry") having a long pot life and favorable dispersibility can be created. Furthermore, flexibility can be imparted to the polymer (A), and by the highly flexible polymer (A) covering the surface of an active material or a solid electrolyte, an electrode plate excellent in rub resistance and powder drop properties can be obtained without an active material layer and a solid electrolyte layer showing hard brittleness, and an all-solid-state secondary battery having favorable oxidation resistance and charge and discharge durability can be obtained.

<Repeating Unit (a2) Derived from Compound Having Tertiary Amino Group>

The polymer (A) contains the repeating unit (a2) derived from a compound having a tertiary amino group. The compound having a tertiary amino group is not particularly limited, and examples thereof include N,N-dimethylacrylamide, N,N-diethylacrylamide, 2-(dimethylamino)ethyl methacrylate, 2-(diethylamino)ethyl methacrylate, 1,2,2,6,6-pentamethyl-4-piperidyl methacrylate, 4-acryloylmorpholine, N-cyclohexylmaleimide, N-ethylmaleimide, and N-acryloyloxyethylhexahydrophthalimide, and the compound can be one or more selected from these. Among these, 1,2,2,6,6-pentamethyl-4-piperidyl methacrylate, N-cyclohexylmaleimide, and N-acryloyloxyethylhexahydrophthalimide are preferable. These monomers can be used alone or in combination of two or more kinds.

The lower limit of the content ratio of the repeating unit (a2) derived from a compound having a tertiary amino group is preferably 0.1 parts by mass, more preferably 0.5 parts by mass, and particularly preferably 1 part by mass when the total amount of the repeating units contained in the polymer (A) is 100 parts by mass. Meanwhile, the upper limit of the content ratio of the repeating unit (a2) derived from a compound having a tertiary amino group is preferably 20 parts by mass, more preferably 15 parts by mass, and particularly preferably 10 parts by mass when the total amount of the repeating units contained in the polymer (A) is 100 parts by mass. When the repeating unit (a2) is contained in the above-mentioned range, binding properties between the polymer (A) and a current collector can be improved without particularly reacting with a sulfide-based electrolyte. Furthermore, by introducing a tertiary amino group into the polymer (A), the binding properties between an active material and a solid electrolyte, and a filler such as the conductive auxiliary agent by the polymer (A) are improved, and a slurry having a long pot life and favorable dispersibility can be created.

<Repeating Unit (a3) Derived from Unsaturated Carboxylic Acid Ester Having Hydroxyl Group>

The polymer (A) can contain a repeating unit (a3) derived from an unsaturated carboxylic acid ester having a hydroxyl group. The unsaturated carboxylic acid ester having a hydroxyl group is not particularly limited, and examples thereof include 2-hydroxymethyl (meth)acrylate, 2-hydroxyethyl (meth)acrylate, 2-hydroxypropyl (meth)acrylate, 3-hydroxypropyl (meth)acrylate, 4-hydroxybutyl (meth)acrylate, 5-hydroxypentyl (meth)acrylate, 6-hydroxyhexyl (meth)acrylate, 1,4-cyclohexanedimethanol monoacrylate, 3-hydroxy-1-adamantyl (meth)acrylate, glycerin mono(meth)acrylate, glycerin di(meth)acrylate, polyethylene glycol (meth)acrylate, and polypropylene glycol (meth)acrylate. Among these, 1,4-cyclohexanedimethanol monoacrylate and 3-hydroxy-1-adamantyl (meth)acrylate are preferable. These monomers can be used alone or in combination of two or more kinds.

The lower limit of the content ratio of the repeating unit (a3) derived from an unsaturated carboxylic acid ester having a hydroxyl group is preferably 0.1 parts by mass, more preferably 0.5 parts by mass, and particularly preferably 1 part by mass when the total amount of the repeating units contained in the polymer (A) is 100 parts by mass. Meanwhile, the upper limit of the content ratio of the repeating unit (a3) derived from an unsaturated carboxylic acid ester having a hydroxyl group is preferably 20 parts by mass, more preferably 15 parts by mass, and particularly preferably 10 parts by mass when the total amount of the repeating units contained in the polymer (A) is 100 parts by mass. When the repeating unit (a3) is contained in the above-mentioned range, binding properties between the polymer (A) and a current collector are improved without reacting with a sulfide-based electrolyte. Furthermore, durability against electrode expansion and contraction during battery charge and discharge is improved by hydrogen bonding between hydroxyl groups, and an all-solid-state secondary battery having favorable oxidation resistance and charge and discharge durability can be obtained.

<Other Repeating Units>

In addition to the repeating units (a1) to (a3), the polymer (A) may contain a repeating unit derived from another monomer copolymerizable therewith. Examples of other monomers include conjugated diene compounds, aromatic vinyl compounds, α,β-unsaturated nitrile compounds, and (meth)acrylamides other than the above-mentioned compound having a tertiary amino group.

Examples of the conjugated diene compounds include 1,3-butadiene, 2-methyl-1,3-butadiene, 2,3-dimethyl-1,3-butadiene, and 2-chloro-1,3-butadiene, and the conjugated diene compound can be one or more selected from these. Among these, 1,3-butadiene is particularly preferable.

Examples of the aromatic vinyl compounds include styrene, α-methylstyrene, p-methylstyrene, vinyltoluene, chlorostyrene, and divinylbenzene, and the aromatic vinyl compound can be one or more selected from these. Among these, styrene is particularly preferable.

Examples of the α,β-unsaturated nitrile compounds include acrylonitrile, methacrylonitrile, α-chloroacrylonitrile, a-ethylacrylonitrile, and vinylidene cyanide, and the α,β-unsaturated nitrile compound can be one or more selected from these. Among these, one or more selected from acrylonitrile and methacrylonitrile is preferable, and acrylonitrile is particularly preferable.

Examples of the (meth)acrylamides other than the compound having a tertiary amino group include acrylamide, methacrylamide, N-isopropylacrylamide, N-methylolmethacrylamide, N-methylolacrylamide, diacetone acrylamide, maleic acid amide, and acrylamide tert-butyl sulfonic acid, and the (meth)acrylamide can be one or more selected from these.

1.2. Physical Properties of Polymer (A)

<Weight-Average Molecular Weight (Mw)>

The weight-average molecular weight (Mw) of the polymer (A) is from 250000 to 3000000 in terms of polystyrene according to a gel permeation chromatography (GPC) method. The lower limit of the weight-average molecular weight of the polymer (A) is preferably 270000 or more, and more preferably 300000 or more. The upper limit of the weight-average molecular weight of the polymer (A) is preferably 2800000 or less, and more preferably 2500000 or less. When the weight-average molecular weight (Mw) of the polymer (A) is within the above-mentioned range, binding properties between an active material and a solid electrolyte, and a filler such as a conductive auxiliary agent by the polymer (A) are improved, and an all-solid-state secondary battery excellent in charge and discharge characteristics is easily obtained. Furthermore, resistance with respect to external forces such as pressing and bending of an electrode plate and a solid electrolyte layer at the time of manufacturing the all-solid-state secondary battery is improved.

<Solubility of Polymer (A)>

The polymer (A) is preferably in a state of being dissolved in the liquid medium (B). The sentence "the polymer (A) is dissolved in the liquid medium (B)" means that the solubility of the polymer (A) with respect to the liquid medium (B) is 1 g or more with respect to 100 g of the liquid medium (B). Since the polymer (A) is in a state of being dissolved in the liquid medium (B), the surface of an active material is easily coated with the polymer (A) excellent in flexibility and binding properties, and therefore falling off of an active material due to expansion and contraction at the time of charge and discharge can be effectively inhibited, and an all-solid-state secondary battery exhibiting favorable charge and discharge durability is easily obtained. Furthermore, the stability of a slurry becomes favorable, and the applicability of the slurry to a current collector is also improved, which is preferable.

<Number Average Particle Diameter>

The polymer (A) is also preferably in a latex state dispersed in the liquid medium (B). In this case, the polymer (A) has a particle shape. The number average particle diameter of the polymer (A) is preferably from 50 nm to 5000 nm, more preferably from 60 nm to 1000 nm, and particularly preferably from 70 nm to 500 nm. When the number average particle diameter of the polymer (A) is within the above-mentioned range, particles of the polymer (A) are likely to be adsorbed on the surface of an active material, and thereby the polymer (A) follows and moves as the active material moves. As a result, migration of only one of the two particles alone can be inhibited, and thereby a deterioration in electrical characteristics can be reduced.

The number average particle diameter of the polymer (A) can be calculated from an average value of diameters of 50 particles obtained from an image of the polymer (A) observed by a transmission type electron microscope (TEM). As the transmission type electron microscope, "H-7650" manufactured by Hitachi High-Technologies Corporation can be used, for example.

<Glass Transition Temperature (Tg)>

The polymer (A) has an endothermic peak in the temperature range of $-10°$ C. or lower when measured by differential scanning calorimetry (DSC) according to JIS K 7121. The temperature of the endothermic peak (that is, the glass transition temperature (Tg)) is preferably in the range of $-10°$ C. or lower, and more preferably in the range of $-25°$ C. or lower. When the endothermic peak of the polymer (A) in the DSC analysis is $-10°$ C. or lower, the polymer (A) can impart more favorable flexibility and binding properties with respect to an active material layer, which is preferable.

1.3. Method of Synthesizing Polymer (A)

A method of synthesizing the polymer (A) is not particularly limited, and basically, it is possible to use a known polymerization method, such as bulk polymerization, solution polymerization, suspension polymerization, emulsion polymerization, and precipitation polymerization, by radical polymerization. Among these, suspension polymerization or emulsion polymerization, which is performed in the presence of a known chain transfer agent, polymerization initiator, or the like in a solvent containing water as a main component, is preferable.

Examples of the chain transfer agent used in the synthesis of the polymer (A) include hypophosphites, phosphorus acids, thiols, secondary alcohols, and amines. These chain transfer agents may be used alone or in combination of two or more kinds. The use amount of the chain transfer agent is preferably 5.0 parts by mass or less with respect to 100 parts by mass of the total mass of a monomer to be polymerized.

The polymerization initiator used in the synthesis of the polymer (A) is preferably a radical initiator, and examples thereof include persulfates such as lithium persulfate, potassium persulfate, sodium persulfate, and ammonium persulfate; azo-based initiators such as 4,4'-azobis(4-cyanovaleric acid); and peroxide-based initiators such as benzoyl peroxide and lauroyl peroxide. The use amount of the polymerization initiator is preferably from 0.1 to 5.0 parts by mass with respect to 100 parts by mass of the total mass of a monomer to be polymerized.

The polymerization temperature at the time of synthesizing the polymer (A) is not particularly limited, but the synthesis is preferably performed in the range from $30°$ C. to $95°$ C., more preferably from $50°$ C. to $85°$ C., in consideration of a manufacturing time and a conversion rate (reaction rate) of a monomer to a copolymer. Furthermore, at the time of polymerization, it is also possible to use a pH adjuster, or EDTA, which is a metal ion encapsulant, or a salt thereof, for the purpose of improving manufacturing stability.

Furthermore, pH adjustment may be performed with a general neutralizing agent such as ammonia, organic amines, potassium hydroxide, sodium hydroxide, and lithium hydroxide before the polymerization or after the polymerization, and in this case, the pH is preferably adjusted to the range from 5 to 11. It is also possible to use EDTA, which is a metal ion encapsulant, or a salt thereof.

2. BINDER COMPOSITION FOR ALL-SOLID-STATE SECONDARY BATTERY

A binder composition for an all-solid-state secondary battery according to the present embodiment contains the above-mentioned polymer (A) and the liquid medium (B). Hereinafter, each component contained in the binder composition for an all-solid-state secondary battery according to the present embodiment will be described in detail. Since the polymer (A) has been described above, detailed description thereof will be omitted.

2.1. Liquid Medium (B)

The liquid medium (B) is not particularly limited, but it is possible to use aliphatic hydrocarbons such as hexane, heptane, octane, decane, and dodecane; alicyclic hydrocarbons such as cyclohexane, cycloheptane, cyclooctane, and cyclodecane; aromatic hydrocarbons such as toluene, xylene, mesitylene, naphthalene, and tetralin; ketones such as methyl hexyl ketone and dipropyl ketone; esters such as butyl acetate, butyl butyrate, and methyl butanoate; ethers such as dibutyl ether, tetrahydrofuran, and anisole; and water-based media containing water. These solvents can be used alone or in combination of two or more kinds.

The content ratio of the liquid medium (B) in the binder composition for an all-solid-state secondary battery according to the present embodiment is preferably from 100 to 10000 parts by mass, and more preferably from 500 to 2000 parts by mass with respect to 100 parts by mass of the polymer (A). When the content ratio of the liquid medium (B) is equal to or more than the above-mentioned lower limit value, mixing properties of the polymer (A) and an active material becomes favorable when preparing a slurry for an all-solid-state secondary battery. Meanwhile, when the content ratio of the liquid medium (B) is equal to or less than the above-mentioned upper limit value, the applicability of the slurry for an all-solid-state secondary battery becomes favorable when manufacturing an active material layer, and a concentration gradient of the polymer (A) and the active material is less likely to occur in drying treatment after application. Furthermore, when manufacturing a solid electrolyte layer, the applicability of the slurry containing the solid electrolyte and the binder composition for an all-solid-state secondary battery becomes favorable, and a concentration gradient of the polymer (A) and the solid electrolyte is less likely to occur in drying treatment after application.

2.2. Other Additives

The binder composition for an all-solid-state secondary battery according to the present embodiment can contain additives other than the above-mentioned components if necessary. Examples of such additives include polymers other than the above-mentioned polymer (A), antioxidants, and thickeners.

<Polymer Other than Polymer (A)>

The binder composition for an all-solid-state secondary battery according to the present embodiment may contain a polymer (excluding those corresponding to the thickener to be described later) other than the polymer (A). When a polymer other than the polymer (A) is contained, flexibility and adhesiveness may be further improved. Such a polymer is not particularly limited, and examples thereof include polyacrylonitrile, polyethylene oxide, polypropylene oxide, polyvinyl chloride, polymethyl methacrylate, polymethyl acrylate, polyvinylidene chloride, polyethyleneimine, polymethacrylonitrile, polyimide, polyamic acid, polyamideimide, polyester, polyethylene, polypropylene, polyvinyl acetate, nitrocellulose, polytetrafluoroethylene, an ethylene-acrylic acid copolymer, an ($Na^+$) ion crosslinked product of an ethylene-acrylic acid copolymer, an ethylene-methacrylic acid copolymer, an ($Na^+$) ion crosslinked product of an ethylene-methacrylic acid copolymer, an ethylene-methyl acrylate copolymer, an ($Na^+$) ion crosslinked product of an ethylene-methyl acrylate copolymer, an ethylene-methyl methacrylate copolymer, an ($Na^+$) ion crosslinked product of an ethylene-methyl methacrylate copolymer, polymers composed of monoalkyltrialkoxysilane polymers, a polymer obtained by copolymerizing a monoalkyltrialkoxysilane polymer and a tetraalkoxysilane monomer, styrene butadiene rubber (SBR), butadiene rubber (BR), a styrene-isoprene copolymer, an isobutylene-isoprene copolymer (butyl rubber), an ethylene-propylene-diene copolymer (ethylene-propylene-diene polymer), an acrylonitrile-butadiene copolymer (NBR), hydrogenated styrene-butadiene rubber, a hydrogenated acrylonitrile-butadiene copolymer, ethylene-propylene-diene rubber (EPDM), and sulfonated ethylene-propylene-diene rubber.

The content ratio of the polymer (A) in the binder composition for an all-solid-state secondary battery according to the present embodiment is preferably from 10 to 80 parts by mass, more preferably from 15 to 65 parts by mass, and particularly preferably from 20 to 50 parts by mass with respect to 100 parts by mass in total of the polymer (A), the polymer other than the polymer (A), and the thickener.

<Antioxidant>

The binder composition for an all-solid-state secondary battery according to the present embodiment may contain an antioxidant. When the antioxidant is contained, it may be possible to further improve low temperature cycle characteristics and low temperature output characteristics of the obtained all-solid-state secondary battery. In addition, it may be possible to further improve the oxidation resistance of the polymer components.

Examples of the antioxidant include compounds such as phenol-based antioxidants, amine-based antioxidants, quinone-based antioxidants, organic phosphorus-based antioxidants, sulfur-based antioxidants, and phenothiazine-based antioxidants. Among these, phenol-based antioxidants and amine-based antioxidants are preferable.

<Thickener>

The binder composition for an all-solid-state secondary battery according to the present embodiment may contain a thickener. When the thickener is contained, it may be possible to further improve the applicability thereof and the charge and discharge characteristics of the obtained all-solid-state secondary battery.

Examples of the thickener include cellulose-based polymers such as carboxymethyl cellulose, methyl cellulose, ethyl cellulose, and hydroxypropyl cellulose; poly (meth) acrylic acid; ammonium salts or alkali metal salts of the above-mentioned cellulose compounds or the above-mentioned poly (meth)acrylic acid; modified polyvinyl alcohol; polyethylene oxide; polyvinylpyrrolidone; polycarboxylic acid; oxidized starch; starch phosphate; casein; various modified starches; chitin; and chitosan derivatives. Among these, cellulose-based polymers are preferable.

When the binder composition for an all-solid-state secondary battery according to the present embodiment contains the thickener, the content ratio of the thickener is preferably 5 parts by mass or less, and more preferably from 0.1 to 3 parts by mass with respect to 100 parts by mass of the total solid content of the binder composition for an all-solid-state secondary battery.

3. SLURRY FOR ALL-SOLID-STATE SECONDARY BATTERY

A slurry for an all-solid-state secondary battery according to the present embodiment contains the above-mentioned binder composition for an all-solid-state secondary battery and a solid electrolyte. The slurry for an all-solid-state secondary battery according to the present embodiment can be used as a material for forming any active material layer of a positive electrode active material layer and a negative electrode active material layer, and can be used as a material for forming a solid electrolyte layer.

The slurry for an all-solid-state secondary battery for forming the positive electrode active material layer contains the above-mentioned binder composition for an all-solid-state secondary battery, the solid electrolyte, and an active material for the positive electrode (hereinafter, also simply referred to as "positive electrode active material"). Furthermore, the slurry for an all-solid-state secondary battery for forming the negative electrode active material layer contains the above-mentioned binder composition for an all-solid-state secondary battery, the solid electrolyte, and an active material for the negative electrode (hereinafter, also simply referred to as "negative electrode active material"). Furthermore, the slurry for an all-solid-state secondary battery for forming the solid electrolyte layer contains the above-mentioned binder composition for an all-solid-state secondary battery and a solid electrolyte. Hereinafter, components that can be contained in the slurry for an all-solid-state secondary battery according to the present embodiment will be described.

3.1. Active Material

<Positive Electrode Active Material>

As the positive electrode active material, it is possible to use inorganic compounds such as $MnO_2$, $MoO_3$, $V_2O_5$, $V_6O_{13}$, $Fe_2O_3$, $Fe_3O_4$, $Li_{(1-x)}CoO_2$, $Li_{(1-x)}NiO_2$, $Li_xCo_ySn_zO_2$, $Li_{(1-x)}Co_{(1-y)}Ni_yO_2$, $Li_{(1+x)}Ni_{1/3}Co_{1/3}Mn_{1/3}O_2$, $TiS_2$, $TiS_3$, $MoS_3$, $FeS_2$, $CuF_2$, and $NiF_2$; carbon materials such as carbon fluoride, graphite, vapor-grown carbon fibers and/or crushed products thereof, PAN-based carbon fibers and/or crushed products thereof, and pitch-based carbon fibers and/or crushed products thereof; and conductive polymers such as polyacetylene and poly-p-phenylene, for example. These positive electrode active materials may be used alone or in combination of two or more kinds.

The average particle diameter of the positive electrode active material is not particularly limited, but it is preferably from 0.1 μm to 50 μm from the viewpoint of increasing the contact area of the solid interface. In order to obtain a predetermined average particle diameter of the positive electrode active material, crushers such as mortars, ball mills, sand mills, vibrating ball mills, satellite ball mills, and swirling airflow type jet mills; and classifiers such as sieves and wind power classifiers may be used. At the time of pulverization, wet type pulverization in which a solvent such as water or methanol is caused to coexist may be performed, if necessary. Both a dry type and the wet type can be used for classification. Furthermore, the positive electrode active material obtained by a firing method may be used after being washed with water, an acidic aqueous solution, an alkaline aqueous solution, or an organic solvent.

The average particle diameter of the active material means the volume average particle diameter measured using a particle diameter distribution measurement device with a laser diffraction method as the measurement principle. Examples of such a laser diffraction type particle diameter distribution measurement device include HORIBA LA-300 series and HORIBA LA-920 series (all manufactured by HORIBA, Ltd.).

In the slurry for an all-solid-state secondary battery for forming the positive electrode active material layer, the content ratio of the positive electrode active material is preferably from 20 to 90 parts by mass, and more preferably from 40 to 80 parts by mass when the total amount of the solid components is 100 parts by mass.

<Negative Electrode Active Material>

The negative electrode active material is not particularly limited as long as it can reversibly occlude and release lithium ions, and examples thereof include carbonaceous materials, metal oxides such as tin oxide and silicon oxide, lithium alone and lithium alloys such as lithium aluminum alloys, metals capable of alloying with lithium such as Sn and Si or In. Among these, carbonaceous materials are preferably used from the viewpoint of reliability, and silicon-containing materials are preferably used from the viewpoint of increasing a battery capacity.

The carbonaceous material is not particularly limited as long as it is a material substantially composed of carbon, and examples thereof include carbonaceous materials obtained by firing petroleum pitch, natural graphite, artificial graphite such as vapor-grown graphite, and various synthetic resins such as PAN-based resin and furfuryl alcohol resin. Examples thereof further include various carbon fibers such as PAN-based carbon fibers, cellulose-based carbon fibers, pitch-based carbon fibers, vapor-grown carbon fibers, dehydrated PVA-based carbon fibers, lignin carbon fibers, glassy carbon fibers, and activated carbon fibers; mesophase microspheres; graphite whiskers; and flat sheet-like graphite.

The silicon-containing material can occlude more lithium ions than commonly used graphite and acetylene black. That is, since a lithium ion occlusion amount per unit weight increases, the battery capacity can be increased. As a result, there is an advantage in which a battery drive time can be lengthened, and use for an in-vehicle battery and the like is expected in the future. Meanwhile, it is known that the silicon-containing material has a large volume change due to occlusion and release of lithium ions, and a volume expansion due to occlusion of lithium ions may be about 3 times in the negative electrode active material containing silicon, whereas a volume expansion is about 1.2 to 1.5 times in graphite and acetylene black. By repeating this expansion and contraction (repeating charging and discharging), the durability of a negative electrode active material layer becomes insufficient, easily causing contact insufficiency, or shortening a cycle life (battery life), for example. Even when such expansion and contraction are repeated, the negative electrode active material layer formed using the slurry for an all-solid-state secondary battery according to the present embodiment exhibits high durability (strength) because the binder component follows, and thus exerts an excellent effect in which favorable cycle life characteristics can be realized even under a high voltage.

The average particle diameter of the negative electrode active material is not particularly limited, but it is preferably from 0.1 μm to 60 μm from the viewpoint of increasing the contact area of the solid interface. In order to make the negative electrode active material have a predetermined average particle diameter, the crushers or classifiers exemplified above can be used.

In the slurry for an all-solid-state secondary battery for forming the negative electrode active material layer, the content ratio of the negative electrode active material is preferably from 20 to 90 parts by mass, and more preferably from 40 to 80 parts by mass when the total amount of the solid components is 100 parts by mass.

3.2. Solid Electrolyte

The slurry for an all-solid-state secondary battery according to the present embodiment contains the solid electrolyte. As the solid electrolyte, a solid electrolyte generally used for an all-solid-state secondary battery can be appropriately selected and used, but a sulfide-based solid electrolyte or an oxide-based solid electrolyte is preferable.

The lower limit of the average particle diameter of the solid electrolyte is preferably 0.01 μm, and more preferably 0.1 μm. The upper limit of the average particle diameter of the solid electrolyte is preferably 100 μm, and more preferably 50 μm.

In the slurry for an all-solid-state secondary battery according to the present embodiment, from the viewpoint of achieving both battery performance and a reduction and maintenance effect of interface resistance, the lower limit of the content ratio of the solid electrolyte is preferably 50 parts by mass, more preferably 70 parts by mass, and particularly preferably 90 parts by mass when the total amount of the solid components is 100 parts by mass. From the same viewpoint, the upper limit of the content ratio of the solid electrolyte is preferably 99.9 parts by mass, more preferably 99.5 parts by mass, and particularly preferably 99.0 parts by mass when the total amount of the solid components is 100 parts by mass. However, when used together with the above-mentioned positive electrode active material or the above-mentioned negative electrode active material, it is preferable that a total sum thereof is in the above-mentioned concentration range.

<Sulfide-Based Solid Electrolyte>

The sulfide-based solid electrolyte preferably contains a sulfur atom (S) and a metal element of Group 1 or Group 2 of the periodic table, has ionic conductivity, and has electron insulation properties. Examples of such a sulfide-based solid electrolyte include a sulfide-based solid electrolyte having a composition formula represented by General Formula (1).

$$Li_a M_b P_c S_d \quad (1)$$

(In Formula (1), M represents an element selected from B, Zn, Si, Cu, Ga and Ge. a to d represent the composition ratio of each element, and a:b:c:d satisfies 1 to 12:0 to 1:1:2 to 9.)

In General Formula (1), the composition ratio of Li, M, P, and S is preferably b=0. More preferably, b=0 and a:c:d=1 to 9:1:3 to 7. Further more preferably, b=0 and a:c:d=1.5 to 4:1:3.25 to 4.5. As will be described later, the composition ratio of each element can be controlled by adjusting a blending amount of a raw material compound when manufacturing the sulfide-based solid electrolyte.

The sulfide-based solid electrolyte may be amorphous (glass), may be crystalline (glass ceramics), or may be only partially crystallized.

The ratio of $Li_2S$ to $P_2S_5$ in Li—P—S-based glass and Li—P—S-based glass ceramic as the molar ratio of $Li_2S$:$P_2S_5$ is preferably from 65:35 to 85:15, and more preferably from 68:32 to 80:20. By setting the ratio of $Li_2S$ and $P_2S_5$ in this range, the lithium ionic conductivity can be increased. The lithium ionic conductivity of the sulfide-based solid electrolyte is preferably $1\times10^{-4}$ S/cm or more, and more preferably $1\times10^{-3}$ S/cm or more.

Examples of such a compound include those made by using a raw material composition containing $Li_2S$ and a sulfide of an element of Group 13 to Group 15. Specific examples include $Li_2S$—$P_2S_5$, $Li_2S$—$GeS_2$, $Li_2S$—$GeS_2$— ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. Among these, a crystalline and/or non-crystalline raw material composition composed of $Li_2S$—$P_2S_5$, $Li_2S$—$GeS_2$—$Ga_2S_3$, $Li_2S$—$GeS_2$—$P_2S_5$, $Li_2S$—$SiS_2$—$P_2S_5$, $Li_2S$—$SiS_2$—$Li_4SiO_4$, and $Li_2S$—$SiS_2$—$Li_3PO_4$ is preferable because it has high lithium ionic conductivity.

Examples of a method of synthesizing the sulfide-based solid electrolyte using such a raw material composition include an amorphization method. Examples of the amorphization method include a mechanical milling method and a melt quenching method. Among these, the mechanical milling method is preferable because it enables processing at room temperature and simplifies the manufacturing process.

The sulfide-based solid electrolyte can be synthesized with reference to the literature such as Journal of Power Sources, 233, (2013), pp 231-235 by T. Ohtomo, A. Hayashi, M. Tatsumisago, Y. Tsuchida, S. Hama, and K. Kawamoto; and Chem. Lett., (2001), pp 872-873 by A. Hayashi, S. Hama, H. Morimoto, M. Tatsumisago, and T. Minami.

<Oxide-Based Solid Electrolyte>

The oxide-based solid electrolyte preferably contains an oxygen atom (O) and a metal element of Group 1 or Group 2 of the periodic table, has ionic conductivity, and has electron insulation properties. Examples of such an oxide-based solid electrolyte include $Li_{xa}La_{ya}TiO_3$ [xa=0.3 to 0.7, ya=0.3 to 0.7] (LLT), $Li_7La_3Zr_2O_{12}$ (LLZ), $Li_{3.5}Zn_{0.25}GeO_4$ having a Lithium super ionic conductor (LISICON) type crystal structure, $LiTi_2P_3O_{12}$ having a Natrium super ionic conductor (NASICON) type crystal structure, $Li_{(1+xb+yb)}(Al, Ga)_{xb}(Ti, Ge)_{(2-xb)}Si_{yb}P_{(3-yb)}O_{12}$ (where 0≤xb≤1, 0≤yb≤1), and $Li_7La_3Zr_2O_{12}$ having a garnet-type crystal structure.

Furthermore, as the oxide-based solid electrolyte, a phosphorus compound containing Li, P, and O is also preferable. Examples thereof include lithium phosphate ($Li_3PO_4$), LiPON in which some of the acid atoms of lithium phosphate are replaced with nitrogen atoms, and LiPOD (where D represents at least one selected from Ti, V, Cr, Mn, Fe, Co, Ni, Cu, Zr, Nb, Mo, Ru, Ag, Ta, W, Pt, and Au). Furthermore, LiAON (where A represents at least one selected from Si, B, Ge, Al, C, and Ga) and the like can also be preferably used.

Among these, $Li_{(1+xb+yb)}(Al, Ga)_{xb}(Ti, Ge)_{(2-xb)}Si_{yb}P_{(3-yb)}O_{12}$ (where 0≤xb≤1, 0≤yb≤1) is preferable because it has high lithium ionic conductivity, is chemically stable, and is easily handled. These may be used alone or may be used in combination of two or more kinds.

The lithium ionic conductivity of the oxide-based solid electrolyte is preferably $1\times10^{-6}$ S/cm or more, more preferably $1\times10^{-5}$ S/cm or more, and particularly preferably $5\times10^{-5}$ S/cm or more.

3.3. Other Additives

In addition to the above-mentioned components, other components may be added the slurry for an all-solid-state secondary battery according to the present embodiment, if necessary. Examples of such a component include conductivity-imparting agents, thickeners, and liquid media (where the amount brought in from the binder composition for an all-solid-state secondary battery is excluded).

<Conductivity-Imparting Agent>

Since a conductivity-imparting agent has an effect of assisting the conductivity of electrons, it is added to the slurry for an all-solid-state secondary battery for forming the positive electrode active material layer or the negative electrode active material layer. Specific examples of the conductivity-imparting agent include carbon such as activated carbon, acetylene black, ketjen black, furnace black, graphite, carbon fiber, and fullerene. Among these, acetylene black and furnace black are preferable. When the slurry for an all-solid-state secondary battery according to the present embodiment contains the conductivity-imparting agent, the content ratio of the conductivity-imparting agent is preferably 20 parts by mass or less, more preferably from 1 to 15 parts by mass, and particularly preferably from 2 to 10 parts by mass with respect to 100 parts by mass of the active material.

<Thickener>

Specific examples of the thickener include thickeners similar to the thickeners exemplified in the above-mentioned binder composition for an all-solid-state secondary battery. When the slurry for an all-solid-state secondary battery according to the present embodiment contains the thickener, the content ratio of the thickener is preferably 5 parts by mass or less, and more preferably from 0.1 to 3 parts by mass with respect to 100 parts by mass of the total solid content of the slurry for an all-solid-state secondary battery.

<Liquid Medium>

Specific examples of the liquid medium include the same liquid medium as the liquid medium (B) exemplified in the above-mentioned binder composition for an all-solid-state secondary battery. When the liquid medium is added to the slurry for an all-solid-state secondary battery according to the present embodiment, the same liquid medium as the liquid medium (B) contained in the binder composition for an all-solid-state secondary battery may be added, and a different liquid medium may be added, but it is preferable to add the same liquid medium. The content ratio of the liquid medium in the slurry for an all-solid-state secondary battery according to the present embodiment can be adjusted to any ratio from the viewpoint of making the applicability thereof favorable and controlling a concentration gradient of the polymer (A) and the active material in drying treatment after application.

3.4. Method of Preparing Slurry for all-Solid-State Secondary Battery

The slurry for an all-solid-state secondary battery according to the present embodiment may be manufactured by any method as long as it contains the above-mentioned binder composition for an all-solid-state secondary battery and a solid electrolyte.

However, from the viewpoint of more efficiently and inexpensively manufacturing a slurry having more favorable dispersibility and stability, it is preferable to manufacture the slurry by adding a solid electrolyte, and an arbitrary additionally component used as necessary to the above-mentioned binder composition for an all-solid-state secondary battery and mixing them. Mixing the binder composition for an all-solid-state secondary battery with other components can be performed by stirring by a known method.

As mixing and stirring means for manufacturing the slurry for an all-solid-state secondary battery, it is required to select a mixer capable of stirring to the extent so that aggregates of solid electrolyte particles do not remain in the slurry, and sufficient dispersion conditions if necessary. The degree of dispersion can be measured by a grain gauge, but it is preferable to perform mixing and dispersion so that aggregates larger than at least 100 μm are eliminated. Examples of the mixer suitable for such conditions include ball mills, bead mills, sand mills, defoaming machines, pigment dispersers, mortar machines, ultrasonic dispersers, homogenizers, planetary mixers, and Hobart mixers.

In preparation of the slurry for an all-solid-state secondary battery (mixing operation of each component), at least a part of the process thereof is preferably performed under reduced pressure. Accordingly, it is possible to prevent bubbles from being generated in the obtained positive electrode active material layer, negative electrode active material layer, or solid electrolyte layer. The degree of depressurization is preferably about $5.0\times10^3$ to $5.0\times10^5$ Pa as the absolute pressure.

4. SOLID ELECTROLYTE SHEET

A solid electrolyte sheet according to the present embodiment has a layer formed by applying the above-mentioned slurry for an all-solid-state secondary battery on a substrate and drying the slurry.

For example, the solid electrolyte sheet according to the present embodiment can be manufactured by applying the above-mentioned slurry for an all-solid-state secondary battery on a film as a substrate by a blade method (for example, doctor blade method), a calendar method, a spin coat method, a dip coat method, an ink jet method, an offset method, a die coat method, or a spray method, drying to form a layer, and thereafter peeling off the film. As such a film, for example, it is possible to use a general one such as a PET film that has been subjected to mold release treatment.

Alternatively, the solid electrolyte sheet can be molded by directly applying the slurry for an all-solid-state secondary battery containing a solid electrolyte onto the surface of a green sheet on which the solid electrolyte sheet is laminated or other configuration members of the all-solid-state secondary battery, and drying the slurry.

It is preferable to apply the above-mentioned slurry for an all-solid-state secondary battery so that the layer thickness of the solid electrolyte sheet according to the present embodiment is in the range of preferably from 1 to 500 μm, and more preferably from 1 to 100 μm. When the layer thickness is within the above-mentioned range, conduction ions such as lithium ions easily move, and therefore the output of the battery increases. Furthermore, when the layer thickness is within the above-mentioned range, the entire battery can be thinned, and therefore the capacity per unit volume can be increased.

The drying of the slurry for an all-solid-state secondary battery is not particularly limited, and it is possible to use any means such as drying by heating, drying under reduced pressure, and drying by heating under reduced pressure. The drying atmosphere is not particularly limited, and the drying can be performed in an air atmosphere, for example.

When the solid electrolyte sheet contains a positive electrode active material and a solid electrolyte, the solid electrolyte sheet has a function as a positive electrode active material layer. When the solid electrolyte sheet contains a negative electrode active material and a solid electrolyte, the solid electrolyte sheet has a function as a negative electrode active material layer. Furthermore, when the solid electrolyte sheet does not contain a positive electrode active material and a negative electrode active material but contains a solid electrolyte, the solid electrolyte sheet has a function as a solid electrolyte layer.

5. ELECTRODE FOR ALL-SOLID-STATE SECONDARY BATTERY AND ALL-SOLID-STATE SECONDARY BATTERY

An electrode for all-solid-state secondary battery according to the present embodiment includes a current collector, and an active material layer formed by applying the above-mentioned slurry for an all-solid-state secondary battery on the surface of the current collector and drying the slurry. Such an electrode for all-solid-state secondary battery can be manufactured by forming a coated film by applying the above-mentioned slurry for an all-solid-state secondary battery on the surface of the current collector such as metallic foil, and then drying the coated film to form an active material layer. Since the electrode for all-solid-state secondary battery manufactured in this manner is made by binding the above-mentioned polymer (A), a solid electrolyte, and an active material, and an active material layer containing an optional component and added as necessary, on the current collector, the electrode for all-solid-state secondary battery is excellent in flexibility, rub resistance, and powder drop resistance and exhibits favorable charge and discharge durability.

As the current collector for the positive electrode and the negative electrode, it is preferable to use an electron conductor that does not cause a chemical change. As the current collector of the positive electrode, aluminum, stainless steel, nickel, titanium, alloys thereof, and those obtained by treating the surface of aluminum and stainless steel with carbon, nickel, titanium or silver are preferable, and among these, aluminum and aluminum alloys are more preferable. As the current collector of the negative electrode, aluminum, copper, stainless steel, nickel, titanium, and alloys thereof are preferable, and aluminum, copper, and copper alloys are more preferable.

As the shape of the current collector, one having a film sheet shape is usually used, but one having a net or punched shape, a lath body, a porous body, a foam body, and a molded body of a fiber group can also be used. The thickness of the current collector is not particularly limited, but it is preferably from 1 µm to 500 µm. Furthermore, it is also preferable that the surface of the current collector is made uneven by surface treatment.

As means for applying the slurry for an all-solid-state secondary battery onto the current collector, it is possible to use a doctor blade method, a reverse roll method, a comma bar method, a gravure method, or an air knife method. As conditions for drying treatment of the film onto which the slurry for an all-solid-state secondary battery is applied, the treatment temperature is preferably from 20° C. to 250° C. and more preferably from 50° C. to 150° C., and the treatment time is preferably from 1 to 120 minutes and more preferably from 5 to 60 minutes.

Furthermore, the active material layer formed on the current collector may be pressed and compressed. As means for press working, a high-pressure super press, a soft calendar, and a 1-ton press machine can be used. The conditions for press working can be appropriately set according to a processing machine used.

The active material layer thus formed on the current collector has the thickness of 40 to 100 µm and the density of 1.3 to 2.0 g/cm$^3$, for example.

The electrode for all-solid-state secondary battery manufactured in this manner is suitably used as electrodes in an all-solid-state secondary battery configured by sandwiching a solid electrolyte layer between a pair of electrodes, specifically, as positive electrodes and/or negative electrodes for an all-solid-state secondary battery. Furthermore, the solid electrolyte layer formed by using the above-mentioned slurry for an all-solid-state secondary battery is suitably used as a solid electrolyte layer for an all-solid-state secondary battery.

The all-solid-state secondary battery according to the present embodiment can be manufactured by using a known method. Specifically, the following manufacturing method can be used.

First, a slurry for an all-solid-state secondary battery containing a solid electrolyte and a positive electrode active material is applied onto a current collector and dried to form a positive electrode active material layer, and a positive electrode for an all-solid-state secondary battery is produced. Next, the slurry for an all-solid-state secondary battery containing a solid electrolyte is applied onto the surface of the positive electrode active material layer of the positive electrode for an all-solid-state secondary battery and dried to form a solid electrolyte layer. Furthermore, in the same manner, the slurry for an all-solid-state secondary battery containing a solid electrolyte and a negative electrode active material is applied onto the surface of the solid electrolyte layer and dried to form a negative electrode active material layer. Finally, by placing a current collector (metallic foil) on the negative electrode side on the surface of the negative electrode active material layer, an all-solid-state secondary battery with a desired structure can be obtained.

Furthermore, a solid electrolyte sheet is produced on a release type PET film and bonded onto a previously produced positive electrode for an all-solid-state secondary battery or negative electrode for an all-solid-state secondary battery. Thereafter, by peeling off the release type PET, an all-solid-state secondary battery with a desired structure can be obtained. A method of applying each of the above-mentioned compositions may be a conventional method. At this time, it is preferable to perform heat treatment on each of the slurry for an all-solid-state secondary battery positive electrode, the slurry for an all-solid-state secondary battery solid electrolyte layer, and the slurry for an all-solid-state secondary battery negative electrode after applying each of them. The heating temperature is preferably equal to or higher than the glass transition temperature of the polymer (A). Specifically, 30° C. or higher is preferable, 60° C. or higher is more preferable, and 100° C. or higher is most preferable. The upper limit is preferably 300° C. or lower, and more preferably 250° C. or lower. By heating in such a temperature range, the polymer (A) can be softened, and the shape thereof can be maintained. Accordingly, favorable binding properties and ionic conductivity can be obtained in the all-solid-state secondary battery.

Furthermore, it is preferable to pressurize while heating. The pressurization pressure is preferably 5 kN/cm$^2$ or more, more preferably 10 kN/cm$^2$ or more, and particularly preferably 20 kN/cm$^2$ or more. In the present description, the discharge capacity indicates a value per active material weight of an electrode, and indicates a value per active material weight of a negative electrode in a half cell.

6. EXAMPLES

Hereinafter, the invention will be specifically described based on examples, but the invention is not limited to these examples. Unless otherwise specified, "parts" and "%" in examples and comparative examples are based on mass.

6.1. Measurement Method for Each Physical Property Value

In the following examples and comparative examples, the measurement method for each physical property value is as follows.

(1) Weight-Average Molecular Weight (Mw), Number Average Molecular Weight (Mn), and Molecular Weight Distribution (Mw/Mn)

Measurement was performed by gel permeation chromatography (GPC, column: trade name "GMHHR-H", manufactured by TOSOH CORPORATION) at the temperature condition of 50° C., and a weight-average molecular weight (Mw) and a number average molecular weight (Mn) in terms of polystyrene were obtained to obtain a molecular weight distribution (Mw/Mn) from these values.

(2) Glass Transition Temperature (Tg)

Measurement was performed by differential scanning calorimetry (DSC) according to ASTM D3418.

(3) Number Average Particle Diameter

Polymer particles were observed using a transmission type electron microscope (TEM) (manufactured by Hitachi High-Technologies Corporation, model "H-7650"), the particle diameters of 50 polymer particles were measured from the obtained image, and an average value thereof was calculated and obtained.

6.2. Synthesis Example of Polymer (A)

Synthesis Example 1

A homogeneous solution, in which 75 parts by mass of dodecyl methacrylate, 19 parts by mass of isobutyl methacrylate, 5 parts by mass of N,N-diethylacrylamide, 1 part by mass of 1,4-cyclohexanedimethanol monoacrylate, 2 parts by mass of lauroyl peroxide, and tert-dodecyl mercaptan were mixed, was added to 60 parts by mass of an aqueous solution of 1% polyvinyl alcohol as a dispersion stabilizer for suspension polymerization, and the mixture was stirred with a homomixer at 500 rpm for 30 minutes. This dispersion liquid was put in a separable flask equipped with a stirrer, a thermometer, a nitrogen introduction tube, and a reflux condenser, and heated at 60° C. for 4 hours under a nitrogen stream for polymerization. After completion of the polymerization, when cooled and left to stand, the reaction system was separated into two layers of polymer particles and transparent water, and almost no emulsion polymer was recognized. This was filtered using a nutsche to take out the polymer particles, washing with water and filtration were repeated, and drying was performed to obtain 50 parts by mass of a polymer (A). The weight-average molecular weight (Mw) and the glass transition temperature (Tg) were measured for the obtained polymer (A), and the results are shown in Table 1.

Synthesis Examples 2 to 19 and 23 to 28

Each polymer (A) of Synthesis Examples 2 to 19 and each polymer of Synthesis Examples 23 to 28 were synthesized while the types and the amount of each monomer were as shown in Table 1 to Table 3 and a synthesis method was appropriately applied in Synthesis Example 1 described above.

Synthesis Example 20

To a glass container equipped with a stirrer, 54 parts by mass of n-butyl acrylate, 13.5 parts by mass of cyclohexyl acrylate, 22.5 parts by mass of dodecyl methacrylate, 5 parts by mass of 2-(diethylamino)ethyl methacrylate, 5 parts by mass of 2-hydroxyethyl acrylate, and 0.1 parts by mass of a polymerizable emulsifier, "ADEKA REASOAP SR1025" (manufactured by ADEKA Corporation) were added, 170 parts by mass of water and 0.5 parts by mass of potassium persulfate as a polymerization initiator were added and sufficiently stirred, and thereafter polymerization was performed by heating at 60° C. for 4 hours under a nitrogen stream.

Next, the pH of the obtained aqueous dispersion liquid was adjusted to 7 using an aqueous solution of 10% by mass sodium hydroxide. Furthermore, heating and depressurizing treatment was performed on the aqueous dispersion liquid of the polymer in which the pH was adjusted to 7 to remove unreacted monomers, and thereafter ion-exchanged water was added to adjust the concentration of solid contents to 30% by mass.

In order to exchange the solvent of the particulate polymer from water to an organic solvent, 500 g of anisole as an organic solvent was added to 100 g of the aqueous dispersion liquid of the particulate polymer in which the concentration of solid contents was adjusted, and water was evaporated under reduced pressure. A binder composition thus obtained was used as a binder composition for producing a positive electrode active material layer, a negative electrode active material layer, and a solid electrolyte layer. The polymer particles contained in the obtained binder composition were observed using a transmission type electron microscope (manufactured by Hitachi High-Technologies Corporation, model "H-7650"), and when the average particle diameters of 50 particles were calculated from the obtained image, it was 200 nm.

Synthesis Examples 21 and 22

Each polymer (A) of Synthesis Examples 21 and 22 was synthesized while the types and the amount of each monomer were as shown in Table 2 and a synthesis method was appropriately applied in Synthesis Example 20 described above.

6.3. Example 1

<Preparation of Binder Composition>

The polymer (A) obtained in Synthesis Example 1 was added to anisole and stirred overnight to prepare a binder composition in which the polymer (A) was dissolved in anisole. Herein, the content of the polymer (A) was adjusted to 10% by mass when the entire binder composition was 100% by mass.

<Preparation of Slurry for all-Solid-State Secondary Battery Positive Electrode>

70 parts by mass of $LiCoO_2$ (average particle diameter: 10 μm) as a positive electrode active material, 30 parts by mass of sulfide glass consisting of $Li_2S$ and $P_2S_5$ ($Li_2S/P_2S_5$=75 mol %/25 mol %, average particle diameter 5 μm) as a solid electrolyte, 2 parts by mass of acetylene black as a conductive auxiliary agent, and 2 parts by mass, equivalent to the solid content, of the binder composition prepared above were mixed, anisole as a liquid organic medium was added, and after adjusting the concentration of solid contents to 75%, mixing was performed for 10 minutes with a rotation and revolution mixer (manufactured by THINKY CORPORATION, THINKY MIXER ARV-310) to prepare a slurry for an all-solid-state secondary battery positive electrode.

<Preparation of Slurry for all-Solid-State Secondary Battery Solid Electrolyte Layer>

100 parts by mass of sulfide glass consisting of $Li_2S$ and $P_2S_5$ ($Li_2S/P_2S_5$=75 mol %/25 mol %, average particle diameter 5 μm) as a solid electrolyte, and 2 parts by mass, equivalent to the solid content, of the binder composition prepared above were mixed, anisole as a liquid organic medium was added, and after adjusting the concentration of solid contents to 55%, mixing was performed for 10 minutes with a rotation and revolution mixer (manufactured by THINKY CORPORATION, THINKY MIXER ARV-310) to prepare a slurry for an all-solid-state secondary battery solid electrolyte layer.

<Preparation of Slurry for all-Solid-State Secondary Battery Negative Electrode>

65 parts by mass of artificial graphite (average particle diameter: 20 μm) as a negative electrode active material, 35 parts by mass of sulfide glass consisting of $Li_2S$ and $P_2S_5$ ($Li_2S/P_2S_5$=75 mol %/25 mol %, average particle diameter 5 μm) as a solid electrolyte, and 2 parts by mass, equivalent to the solid content, of the binder composition prepared above were mixed, anisole as a liquid organic medium was added, and after adjusting the concentration of solid contents to 65%, mixing was performed for 10 minutes with a rotation and revolution mixer (manufactured by THINKY CORPORATION, THINKY MIXER ARV-310) to prepare a slurry for an all-solid-state secondary battery negative electrode.

<Production of Positive and Negative Electrode and Solid Electrolyte Layers>

The slurry for an all-solid-state secondary battery positive electrode prepared above was applied onto an aluminum foil by a doctor blade method, and drying was performed over 3 hours by evaporating anisole under reduced pressure at 120° C. to produce an all-solid-state secondary battery positive electrode on which a positive electrode active material layer with the thickness of 0.1 mm was formed.

The slurry for an all-solid-state secondary battery solid electrolyte layer prepared above was applied onto a release type PET film by a doctor blade method, and drying was performed over 3 hours by evaporating anisole under reduced pressure at 120° C. to produce a solid electrolyte layer with the thickness of 0.1 mm.

The slurry for an all-solid-state secondary battery negative electrode prepared above was applied onto a stainless steel foil by a doctor blade method, and drying was performed over 3 hours by evaporating anisole under reduced pressure at 120° C. to produce an all-solid-state secondary battery negative electrode on which a negative electrode active material layer with the thickness of 0.1 mm was formed.

<Peel Strength Test of all-Solid-State Secondary Battery Positive Electrode>

For the positive electrode active material layer formed on the aluminum foil of the all-solid-state secondary battery positive electrode obtained above, a tape having the width of 20 mm was bonded onto the positive electrode active material layer to measure a peel strength when peeling off this tape under conditions of the peel angle of 90° and the peel speed of 50 mm/min. The evaluation criteria are as follows. The results are shown in Table 1.

(Evaluation Criteria)

AA: a peel strength was 20 N/m or more.

A: a peel strength was 10 N/m or more and less than 20 N/m.

B: a peel strength was 5 N/m or more and less than 10 N/m.

C: a peel strength was less than 5 N/m.

<Flexibility Test of all-Solid-State Secondary Battery Positive Electrode>

The aluminum foil side of the positive electrode test piece was placed along a metal rod with the diameter of 1.0 mm and wound around this metal rod to evaluate whether or not the positive electrode active material layer was cracked and whether or not the wound end part was damaged. The evaluation criteria are as follows. The results are shown in Table 1. When damage to the positive electrode active material layer is not shown, it indicates that the flexibility of the test piece is high and the process suitability for assembling an all-solid-state secondary battery is favorable.

(Evaluation Criteria)

A: no cracks in the positive electrode active material layer, and no damage to the wound end part.

B: no cracks in the positive electrode active material layer, and there is damage to the wound end part.

C: there are cracks in the positive electrode active material layer.

<Measurement of Lithium Ionic Conductivity of Solid Electrolyte Layer>

The solid electrolyte layer peeled off from the PET film was sandwiched between cells made of two stainless steel flat plates, and measured using an impedance analyzer, and the lithium ionic conductivity was calculated from the Nyquist plot. The evaluation criteria are as follows. The results are shown in Table 1. It is shown that as the lithium ionic conductivity becomes larger, an all-solid-state secondary battery having favorable battery performance can be obtained.

(Evaluation Criteria)

AA: lithium ionic conductivity is $0.8 \times 10^{-4}$ S/cm or more and $1.0 \times 10^{-4}$ S/cm or less A: lithium ionic conductivity is $0.5 \times 10^{-4}$ S/cm or more and less than $0.8 \times 10^{-4}$ S/cm B: lithium ionic conductivity is $0.2 \times 10^{-4}$ S/cm or more and less than $0.5 \times 10^{-4}$ S/cm C: lithium ionic conductivity is less than $0.2 \times 10^{-4}$ S/cm <Production of Negative Electrode Half Cell and Electrochemical Evaluation>

Each of layers composed of sulfide glass ($Li_2S/P_2S_5$=75 mol %/25 mol %, average particle diameter 5 μm) alone was laminated so that it was disposed between a produced negative electrode coating sheet and an Li (thickness 0.2 mm)-In (thickness 0.1 mm) laminate, and thereby a negative electrode half cell was produced.

A charge and discharge test was performed on the obtained negative electrode half cell. For charge and discharge, measurement was performed at a 0.1 C rate in the potential range from 0.88 to −0.57 V (vs. Li—In). This charge and discharge at the 0.1 C rate was repeatedly performed, and when the discharge capacity in the first cycle was A (mAh/g) and the discharge capacity in the 20th cycle was B (mAh/g), the capacity retention rate after 20 cycles was calculated by the following formula. The evaluation criteria are as follows. The results are shown in Table 1.

Capacity retention rate after 20 cycles (%)=$(B/A) \times 100$

C of the C rate is a time rate, and is defined as (1/X) C=rated capacity (Ah)/X (h). X represents a time when charging or discharging the rated capacity amount of electricity. For example, 0.1 C means that a current value is the rated capacity (Ah)/10 (h).

(Evaluation Criteria)

AA: capacity retention rate was 95% or more and 100% or less

A: capacity retention rate was 90% or more and less than 95%

B: capacity retention rate was 85% or more and less than 90%

C: capacity retention rate was less than 85%

6.4. Examples 2 to 22 and Comparative Examples 1 to 6

Except that the polymers shown in Table 1 to Table 3 were used, a binder composition for an all-solid-state secondary battery was obtained in the same manner as in Example 1 above to produce a slurry for an all-solid-state secondary battery and an all-solid-state secondary battery electrode, and evaluation was performed in the same manner as in Example 1 above. The results of each are shown in Table 1 to Table 3.

6.5. Evaluation Results

Table 1 to Table 3 below summarize polymer compositions used in Examples 1 to 22 and Comparative Examples 1 to 6, physical properties of each, and evaluation results of each.

TABLE 1

| | Example No. | | 1 | 2 | 3 | 4 | 5 | 6 | 7 | 8 | 9 | 10 | 11 |
|---|---|---|---|---|---|---|---|---|---|---|---|---|---|
| Polymer composition | Synthesis Example No. | | 1 | 2 | 3 | 4 | 5 | 6 | 7 | 8 | 9 | 10 | 11 |
| | Unsaturated carboxylic acid ester (a1) | n-BA | | 78 | | | 75 | | 71 | 67 | | | 78 |
| | | 2-EHA | | | | 54 | | 5 | | | | | |
| | | CHA | | | | | | | | | | 12 | |
| | | IBA | | | | | 5 | | | | | | |
| | | n-BMA | | 20 | 29.5 | | 19 | 19 | 18 | 17 | | | |
| | | i-BMA | 19 | | | | | | | | | | |
| | | MMA | | | | 44 | | | | | | | |
| | | CHMA | | | | | | | | | | 29 | 20 |
| | | LAMA | 75 | | 69 | | | 69 | | | 67 | 69 | |
| | Compound having tertiary amino group (a2) | DEAA | 5 | | | | | | | | | | |
| | | DEAEMA | | 1 | | | | | | | | | |
| | | PMPMA | | | 0.5 | | | | | | | | |
| | | AMP | | | | 1 | | | | | | | |
| | | CHMI | | | | | | 5 | | | | 1 | 1 |
| | | EMI | | | | | 1 | | | | | | |
| | | AOHI | | | | | | | | 10 | | | |
| | | DMAA | | | | | | | | | 15 | | |
| | | DMAEMA | | | | | | | | | | 20 | |
| | Unsaturated carboxylic acid ester having hydroxyl group (a3) | HAA | | 1 | 1 | | | 1 | | 1 | 1 | | |
| | | CHDMA | 1 | | | 1 | 1 | | 1 | | | 1 | 1 |
| | | HEA | | | | | | | | | | | |
| | | HHA | | | | | | | | | | | |
| | Compound having primary or secondary amino group | AA | | | | | | | | | | | |
| | | IPAA | | | | | | | | | | | |
| | | HEAA | | | | | | | | | | | |
| | | CEA | | | | | | | | | | | |
| | Monomer total | | 100 | 100 | 100 | 100 | 100 | 100 | 100 | 100 | 100 | 100 | 100 |
| Physical property value | Weight-average molecular weight (Mw) | | $7.0 \times 10^5$ | $7.6 \times 10^5$ | $4.6 \times 10^5$ | $8.9 \times 10^5$ | $9.4 \times 10^5$ | $8.1 \times 10^5$ | $9.1 \times 10^5$ | $6.4 \times 10^5$ | $5.5 \times 10^5$ | $2.7 \times 10^5$ | $8.9 \times 10^5$ |
| | Glass transition temperature (Tg)/°C. | | −45° C. | −39° C. | −42° C. | −15° C. | −33° C. | −29° C. | −28° C. | −22° C. | −23° C. | −35° C. | −37° C. |
| | Number average particle diameter/nm | | — | — | — | — | — | — | — | — | — | — | — |
| Evaluation results | Peel strength test | | AA | AA | AA | A | AA | AA | AA | AA | AA | A | A |
| | Flexibility test | | A | A | A | A | A | A | A | A | A | A | A |
| | Lithium ionic conductivity | | A | A | AA | A | AA | A | AA | A | A | AA | AA |
| | Cycle life characteristic (capacity retention rate) | | A | A | A | A | AA | A | A | A | A | A | AA |

TABLE 2

| | Example No. | | 12 | 13 | 14 | 15 | 16 | 17 | 18 | 19 | 20 | 21 | 22 |
|---|---|---|---|---|---|---|---|---|---|---|---|---|---|
| Polymer composition | Synthesis Example No. | | 12 | 13 | 14 | 15 | 16 | 17 | 18 | 19 | 20 | 21 | 22 |
| | Unsaturated carboxylic acid ester (a1) | n-BA | | 75 | 63.9 | | | 57 | | 90 | 54 | | 27 |
| | | 2-EHA | | | | | | | | | | 49.5 | 31.5 |
| | | CHA | | | | | | | | | 5 | 13.5 | |
| | | IBA | | | | | | | | | | | |
| | | n-BMA | | | 16 | 27 | | | | | | 18 | 18 |
| | | i-BMA | | | | | 16 | | 14 | | | | |
| | | MMA | | | | | | | | | | | |
| | | CHMA | 29 | 19 | | | | | | | | 22.5 | 13.5 |
| | | LAMA | 69 | | | 62 | 63.9 | | 54 | | 22.5 | | |

TABLE 2-continued

| | Example No. | 12 | 13 | 14 | 15 | 16 | 17 | 18 | 19 | 20 | 21 | 22 |
|---|---|---|---|---|---|---|---|---|---|---|---|---|
| | Compound having tertiary amino group (a2) | | | | | | | | | | | |
| | DEAA | | | | | | | | | | | |
| | DEAEMA | | | | | | | | | | 5 | | |
| | PMPMA | | | | | | | | | 5 | | | 5 |
| | AMP | | | | | | | | | | | 5 | |
| | CHMI | 1 | 5 | 20 | | | | | | | | |
| | EMI | | | | | | | | | | | |
| | AOHI | | | | | | | | 2 | | | |
| | DMAA | | | | 1 | | 25 | | | | | |
| | DMAEMA | | | | | 0.1 | | | | | | |
| | Unsaturated carboxylic acid ester having hydroxyl group (a3) | | | | | | | | | | | |
| | HAA | | | | 10 | | 4 | 30 | | | | |
| | CHDMA | 1 | 1 | 0.1 | | 20 | | | | | | |
| | HEA | | | | | | | | | 5 | | 5 |
| | HHA | | | | | | | | | | 5 | |
| | Compound having primary or secondary amino group | | | | | | | | | | | |
| | AA | | | | | | | | | | | |
| | IPAA | | | | | | | | | | | |
| | HEAA | | | | | | | | | | | |
| | CEA | | | | | | | | | | | |
| Physical property value | Monomer total | 100 | 100 | 100 | 100 | 100 | 100 | 100 | 100 | 100 | 100 | 100 |
| | Weight-average molecular weight (Mw) | 15 × 10⁵ | 9.0 × 10⁵ | 6.2 × 10⁵ | 7.5 × 10⁵ | 8.9 × 10⁵ | 9.0 × 10⁵ | 7.5 × 10⁵ | 7.9 × 10⁵ | 25 × 10⁵ | 28 × 10⁵ | 28 × 10⁵ |
| | Glass transition temperature (Tg)/° C. | −34° C. | −33° C. | −18° C. | −27° C. | −38° C. | −22° C. | −20° C. | −25° C. | −12° C. | −24° C. | −30° C. |
| | Number average particle diameter/nm | — | — | — | — | — | — | — | — | 200 nm | 5000 nm | 100 nm |
| Evaluation results | Peel strength test | AA | A | AA | A | AA | A | A | AA | A | A | A |
| | Flexibility test | A | A | A | A | A | A | A | A | A | A | A |
| | Lithium ionic conductivity | AA | AA | A | A | A | A | A | AA | A | A | A |
| | Cycle life characteristic (capacity retention rate) | AA | A | A | A | A | A | A | A | A | A | A |

TABLE 3

| | Comparative Example No. | Comparative Example 1 | Comparative Example 2 | Comparative Example 3 | Comparative Example 4 | Comparative Example 5 | Comparative Example 6 |
|---|---|---|---|---|---|---|---|
| Polymer composition | Synthesis Example No. | Synthesis Example 23 | Synthesis Example 24 | Synthesis Example 25 | Synthesis Example 26 | Synthesis Example 27 | Synthesis Example 28 |
| | Unsaturated carboxylic acid ester (a1) | | | | | | |
| | n-BA | | | | | 75 | |
| | 2-EHA | 54 | 4.5 | | | | 55 |
| | CHA | | | | | | |
| | IBA | | 4.5 | | | | |
| | n-BMA | | 19 | 28 | | 19 | |
| | i-BMA | | | | | | |
| | MMA | 44 | | | | | 45 |
| | CHMA | | | | 26 | | |
| | LAMA | | 66 | 65 | 62 | | |
| | Compound having tertiary amino group (a2) | | | | | | |
| | DEAA | | | | | | |
| | DEAEMA | | | | | 3 | |
| | PMPMA | | | | | | |
| | AMP | | | | | | |
| | CHMI | | | | | | |
| | EMI | | | | | | |
| | AOHI | | | | | | |
| | DMAA | | | | | | |
| | DMAEMA | | | | | | |
| | Unsaturated carboxylic acid ester having hydroxyl group (a3) | | | | | | |
| | HAA | | 1 | | 3 | | |
| | CHDMA | 1 | | 5 | 2 | | |
| | HEA | | | | | | |
| | HHA | | | | | | |
| | Compound having primary or secondary amino group | | | | | | |
| | AA | 1 | | | | | |
| | IPAA | | 5 | | | | |
| | HEAA | | | | 2 | | |
| | CEA | | | | 10 | | |
| | Monomer total | 100 | 100 | 100 | 100 | 100 | 100 |

TABLE 3-continued

| | Comparative Example No. | Comparative Example 1 | Comparative Example 2 | Comparative Example 3 | Comparative Example 4 | Comparative Example 5 | Comparative Example 6 |
|---|---|---|---|---|---|---|---|
| Physical property value | Weight-average molecular weight (Mw) | $5.0 \times 10^5$ | $9.2 \times 10^5$ | $4.1 \times 10^5$ | $3.8 \times 10^5$ | $1.8 \times 10^5$ | $7.2 \times 10^5$ |
| | Glass transition temperature (Tg)/° C. | −40° C. | −24° C. | −39° C. | −32° C. | −34° C. | −48° C. |
| | Number average particle diameter/nm | — | — | — | — | — | — |
| Evaluation results | Peel strength test | A | A | A | B | C | C |
| | Flexibility test | B | C | B | B | C | C |
| | Lithium ionic conductivity | B | C | C | C | B | A |
| | Cycle life characteristic (capacity retention rate) | C | C | C | B | B | B |

The abbreviations of monomers in Table 1 to Table 3 above respectively represent the following compounds.

<Unsaturated Carboxylic Acid Ester (a1)>
  n-BA: n-butyl acrylate
  2-EHA: 2-ethylhexyl acrylate
  CHA: cyclohexyl acrylate
  IBA: isobornyl acrylate
  n-BMA: n-butyl methacrylate
  i-BMA: isobutyl methacrylate
  MMA: methyl methacrylate
  CHMA: cyclohexyl methacrylate
  LAMA: dodecyl methacrylate
<Compound Having Tertiary Amino Group (a2)>
  DEAA: N,N-diethylacrylamide
  DEAEMA: 2-(diethylamino)ethyl methacrylate
  PMPMA: 1,2,2,6,6-pentamethyl-4-piperidyl methacrylate
  AMP: acryloyl morpholine
  CHMI: N-cyclohexylmaleimide
  EMI: N-ethylmaleimide
  AOHI: N-acryloyloxyethyl hexahydrophthalimide
  DMAA: N,N-dimethylacrylamide
  DMAEMA: 2-(dimethylamino)ethyl methacrylate
<Unsaturated Carboxylic Acid Ester Having Hydroxyl Group (a3)>
  HAA: 3-hydroxy-1-adamantyl acrylate
  CHDMA: 1,4-cyclohexanedimethanol monoacrylate
  HEA: 2-hydroxyethyl acrylate
  HHA: 6-hydroxyhexyl acrylate
<Compound Having Primary or Secondary Amino Group>
  AA: acrylamide
  IPAA: isopropylacrylamide
  HEAA: hydroxyethyl acrylamide
  CEA: 2-cyanoethyl acrylate From the results of Table 1 to Table 3, in the binder composition for an all-solid-state secondary batteries of Examples 1 to 22, it was confirmed that the active material layer could be formed with high workability, and high adhesiveness could be obtained in the formed active material layer with respect to a current collector.

Furthermore, in Examples 1 to 22, one containing the active material and the solid electrolyte in the binder composition for an all-solid-state secondary battery was used as a slurry for an all-solid-state secondary battery electrode. In addition, in the active material layer formed by the slurry, it was confirmed that there was no occurrence of falling off, cracks, and the like of the active material and the solid electrolyte due to the active material layer itself becoming brittle at the time of measuring the peel strength, and sufficient binding properties were obtained for the binder between both the active material and the solid electrolyte. Accordingly, in the active material layer formed by using the binder composition for an all-solid-state secondary battery of the invention, it is presumed that sufficient adhesiveness with respect to the solid electrolyte layer can be can be obtained, that high workability can be obtained even when the solid electrolyte layer is formed by using the binder composition for an all-solid-state secondary battery of the invention, and that sufficient adhesiveness with respect to the active material layer can be obtained in the formed solid electrolyte layer.

The invention is not limited to the above-mentioned embodiments, and various modifications are possible. The invention includes substantially the same configuration as the configuration described in the embodiments (for example, a configuration with the same function, method, and result, or a configuration with the same object and effect). The invention further includes a configuration in which a non-essential part of the configuration described in the above-mentioned embodiment is replaced with another configuration. The invention also further includes a configuration exhibiting the same effects as the configuration described in the above-mentioned embodiment or a configuration that can achieve the same object. The invention also further includes a configuration in which a known technique is added to the configuration described in the above-mentioned embodiment.

The invention claimed is:

1. A solid electrolyte sheet, comprising:
  a layer comprising, in dried form, a solid electrolyte and a binder composition comprising a polymer (A) comprising, in polymerized form, (a1) an unsaturated carboxylic acid ester not having a hydroxyl group; and (a2) a tertiary amino compound comprising a tertiary amino group,
  wherein the polymer (A) has a weight-average molecular weight (Mw) in a range of from 250,000 to 3,000,000, and
  wherein an endothermic peak is observed at −10° C. or lower when differential scanning calorimetry (DSC) is performed on the polymer (A) in accordance with JIS K 7121,
  wherein no electrolyte solution is present in the sheet or contacts the sheet.

2. The sheet of claim 1, wherein the polymer (A) further comprises, in polymerized form:
  (a3) an unsaturated carboxylic acid ester having a hydroxyl group.

3. The sheet of claim 1, wherein the unsaturated carboxylic acid ester (a3) is comprised in the polymer (A) in a range of from 0.1 to 20 parts by mass, when a total amount of repeating units in the polymer (A) is 100 parts by mass.

4. The sheet of claim 1, wherein the tertiary amino compound (a2) is comprised in the polymer (A) in a range of from 0.1 to 20 parts by mass, when a total amount of repeating units contained in the polymer (A) is 100 parts by mass.

5. The sheet of claim 1, wherein the solid electrolyte comprises an oxide-based solid electrolyte.

6. The sheet of claim 1, wherein the solid electrolyte comprises a sulfide-based solid electrolyte.

7. A method of manufacturing the solid electrolyte sheet of claim 1, the method comprising:
applying a slurry on a substrate and drying the slurry,
wherein the slurry comprises (i) a liquid medium, (ii) a solid electrolyte, and (iii) a binder comprising a polymer (A) comprising, in polymerized form, (a1) an unsaturated carboxylic acid ester not having a hydroxyl group; and (a2) a tertiary amino compound comprising a tertiary amino group,
wherein the polymer (A) has a weight-average molecular weight (Mw) in a range of from 250,000 to 3,000,000, and
wherein an endothermic peak is observed at −10° C. or lower when differential scanning calorimetry (DSC) is performed on the polymer (A) in accordance with JIS K 7121.

8. A method of manufacturing an all-solid-state secondary battery, the method comprising:
manufacturing an all-solid-state secondary battery by the method of claim 7 and forming the all-solid-state secondary battery.

9. An all-solid-state secondary battery, comprising:
a positive electrode active material layer;
a solid electrolyte layer; and
a negative electrode active material layer,
wherein at least one layer of the positive electrode active material layer, the solid electrolyte layer, and the negative electrode active material layer, comprises, in dried form, a solid electrolyte and a binder composition comprising a polymer (A) comprising, in polymerized form, (a1) an unsaturated carboxylic acid ester not having a hydroxyl group; and (a2) a tertiary amino compound comprising a tertiary amino group,
wherein the polymer (A) has a weight-average molecular weight (Mw) in a range of from 250,000 to 3,000,000,
wherein an endothermic peak is observed at −10° C. or lower when differential scanning calorimetry (DSC) is performed on the polymer (A) in accordance with JIS K 7121, and
wherein no electrolyte solution is used in the all-solid-state secondary battery.

10. The battery of claim 9, wherein the polymer (A) further comprises, in polymerized form:
(a3) an unsaturated carboxylic acid ester having a hydroxyl group.

11. The battery of claim 9, wherein the unsaturated carboxylic acid ester (a3) is comprised in the polymer (A) in a range of from 0.1 to 20 parts by mass, when a total amount of repeating units in the polymer (A) is 100 parts by mass.

12. The battery of claim 9, wherein the tertiary amino compound (a2) is comprised in the polymer (A) in a range of from 0.1 to 20 parts by mass, when a total amount of repeating units contained in the polymer (A) is 100 parts by mass.

13. The battery of claim 9, wherein the solid electrolyte comprises an oxide-based solid electrolyte.

14. The battery of claim 9, wherein the solid electrolyte comprises a sulfide-based solid electrolyte.

* * * * *